United States Patent Office 3,242,048
Patented Mar. 22, 1966

3,242,048
BETAINE GLUTAMATE AND METHODS OF USING SAME
Gilbert J. Straub, Bayside, Wis., and Alfred Halpern, Great Neck, N.Y., assignors to Synergistics, Inc., New York, N.Y., a corporation of New York
No Drawing. Filed June 20, 1962, Ser. No. 203,725
7 Claims. (Cl. 167—55)

This application is a continuation-in-part of applicants' co-pending application, Serial No. 715,512, filed February 17, 1958, now abandoned.

This invention relates to betaine glutamate, a new and novel salt, which is useful for therapeutic purposes, and the methods of preparing and administering the same.

Glutamic acid, first isolated from an acid hydrolyzate of wheat gluten, has been characterized chemically as 2-aminopentanedioic acid, and its chemical structure confirmed by synthesis. It occurs as a white crystal, virtually insoluble in water and insoluble in ether and acetone.

Metabolically, glutamic acid is one of the most reactive of amino acids, being involved in various deamination, transamination and amination reactions in the body. It participates, for example, in the conversion of ornithine to citrulline in the Kreb-Henseloit cycle of urea formation. By a reversible process of oxidative deamination, it is converted to a-ketoglutaric acid, thereby serving as a link between the metabolism of proteins and of carbohydrates. It is metabolically related also to histidine.

Glutamic acid has long been recognized as an important amino acid in cerebral metabolism. It appears to be the principal amino acid oxidized in the brain and by virtue of the fact that it supplies energy to the brain cell, an enhancement of cerebral tissue metabolism may be brought about by an optimal supply of glutamic acid. A further role of the glutamates in the metabolic system involves the reduction of blood ammonia concentration. This latter action is accomplished through the conversion of glutamate to glutamine in the presence of ammonia and consequent transport of the ammonia to the kidney for excretion.

Both the free glutamic acid and its metabolic amide, glutamine, are involved in the metabolism and functioning of nervous tissue. The concentration of glutamic acid in the brain is greater than in any other tissue, with the possible exception of the spleen. Since the brain is commonly considered to utilize principally carbohydrates for its energy requirements and to lack the nitrogen-catabolyzing powers of the liver and kidneys, glutamic acid thus occupies a unique position among amino acids.

The main disadvantage of glutamate therapy is the difficulty of administering the large daily doses which are required to obtain optimal physiologic effects. The use of the sodium, potassium or calcium salts of glutamic acid is not always feasible because of the problems encountered with the metabolism of these ions. For example, sodium ion is contraindicated in cardiovascular diseases complicated by water retention. The potassium salt in the necessary dosage would exceed the safe potassium level. Excess amounts of calcium ions would not be desirable because of metabolic complications which may arise. In contrast to the limitations of the above mentioned salts, betaine glutamate, the product of this invention, may be administered in massive doses without undesirable side effects while retaining the therapeutic effectiveness of the glutamate moiety.

Certain disease states, as for example, alcoholism, chronic debility and impaired nutrition, are characterized by manifest symptoms of disturbed nitrogen balance and other signs of metabolic failure. It is known that in these disease states there is a greater demand for the chemical substrate of the metabolic reactions involving amination and transamination, as well as transmethylation reactions. There is a need to supply these enzymatic substrates materials in order to inhibit or even to reverse the destructive symptoms of these disease states.

It is of interest to note that the symptoms of metabolic failure of alcoholism may be divided into two major groups: those which are medical and those which are neurologic. The medical symptomatology, which is chiefly associated with the gastric and hepatic systems, are closely related to the metabolic deficit of the nervous system in that proper neurohumoral control is lacking. Thus, it is noted that the symptoms of nausea and vomiting as well as gastritis, have been demonstrated on the basis gastroscopy, not to be related to the stomach as the primary source, but that this is probably mediated through the nervous system. The symptoms of alcoholic gastritis involve abdominal distention, epigastric distress, belching and appear to simulate the gastric and duodenal ulcer. Hematemesis, sometimes assuming serious proportions, may result from alcoholic gastritis.

The clinical manifestations of alcoholism have also been associated with metabolic failure in the liver, giving rise to alcoholic cirrhosis. This is of special importance when considering the role of transaminating, aminating and deaminating enzyme reactions as well as methylating and transmethylating reactions, since the liver is a major site for the occurrence of these reactions. Alcoholism also is an important factor in the production of pancreatitis. In its mildest form, pancreatitis is usually diagnosed as acute gastritis and has even been confused with gastric ulcer.

The destructive effect of alcoholism on the nervous system is well known, lowering the efficiency of mental functioning, even after the ingestion of moderate amounts of alcohol. It has been shown, for example, that alcohol will lower cerebral metabolism, having an over-all effect of depressing the faculties of judgment and the ability to reason and think clearly. Similar neurogastric symptomatology is associated with impaired nutritional balance, effecting ammonia levels of the blood and also in those states wherein there is an inability to carry out metabolism involving the Krebs-Henseloit cycle.

Betaine is the methylated amino-acetic acid and occurs as a colorless, deliquescent crystal, melting at 293° C., soluble in water and alcohol. Betaine is capable of preventing the accumulation of fat in liver tissue and this action is attributed to its ability to serve as a methyl-group donor, thereby entering into the fat metabolism. Thus, betaine serves to supply a substrate for the enzyme reaction involving the formation of phospho-lipids which have a greater solubility and miscibility in body fluids than does the neutral fat. The role of betaine in correcting fatty infiltration of the liver is well established in medicine. See, for example, Archives of Internal Medicine, vol. 62, p. 741, 1935.

Betaine glutamate is a white crystalline powder, melting at 117° to 120° C., having a sweet taste and is stable to heat and light. Betaine glutamate is soluble in water to the extent of three percent and the saturated solution has a pH of 3.4. The new compound is insoluble in ether, benzene, acetone and methylethylketone, and it is capable of acting as both an acid and alkaline buffer.

Betaine glutamate may be prepared by the reaction between betaine base, and glutamic acid in an anhydrous alcoholic medium. The reaction is carried out under reflux with constant stirring. Complete solution does not occur and constant stirring during refluxing is necessary. The desired compound is obtained in a high degree of purity by distilling the solvent and drying the resulting crystals. An important characteristic of the conditions of the reaction is that an essentially anhydrous medium be maintained in order to avoid the formation of a glutamic ester of the anhydride grouping of the betaine. The compound obtained has a molecular weight of 264.26, and analyzes in excellent agreement with its theoretical carbon, hydrogen and nitrogen values.

Betaine glutamate may be administered in the form of tablets, capsules, granules and powder, or liquid preparations by the oral route or may be dissolved in water-for-injection to be utilized by the parenteral route. The daily dose of betaine glutamate ranges from 2 to 20 grams per day and the preferred daily dosage is between 6 and 8 grams per day. The daily dose of the compound is administered at one time or in divided unit doses, throughout the day, preferably taken at meals. Each unit dose may contain from 2 to 10 grams of the compound.

In a study evaluating the properties of betaine glutamate in 5 patients with symptoms of alcoholic gastritis, the new compound was administered at a dosage level of 6 to 8 grams per day. The patients presented the well known, clinically established symptoms of alcoholic gastritis, such as belching, flatulence, nausea and also the neurologic symptoms associated with alcoholism. After receiving the drug in the form of a granule at a dosage level of from 6 to 8 grams per day, for a period of 4 to 6 weeks, a reversal of the symptoms of gastritis was observed and an improved neurologic status was observed. The patients became more alert and exhibited better sleep patterns. There was marked appetite improvement and a general improvement in their nutritional status. Comparing these results with those of a comparable control group, members of which had received glutamic acid at a dosage level of approximately 15 grams per day, it was noted, by the investigator, that the beneficial effects after betaine glutamate were obtained in a shorter period of time and utilizing a lower dosage of glutamic acid equivalent than had been achieved with glutamic acid alone.

Similarly, on a comparison with control patients receiving high dosages of betaine, for the modulating effect on the hepatic system, it was observed that the effect achieved after betaine glutamate was superior and obtained within a shorter period of time than was the physiologic effects on the hepatogastric system resulting after dosages of from 6 to 8 grams of betaine per day. Thus, it was established by this study that betaine glutamate exerts an effect of reversing the alcoholic gastritis in a shorter period of time and with greater effectiveness than is obtained by administering larger concentrations of either of its component moieties alone.

The following examples illustrate the scope of this invention:

*Example 1*

To a solution of one mol of betaine, dissolved in one liter of anhydrous methanol, is added an exact one mol or equivalent of glutamic acid suspended in one liter of anhydrous methanol. The mixture is warmed to reflux temperature for one hour with constant stirring. The methanol is then evaporated by distillation at no higher than water bath temperature. The resulting white crystalline compound is oven-dried at 60° C. to remove the last trace of solvent. The dried betaine glutamate melts at 117° to 120° C. and consists of 44.33 percent betaine and 55.67 percent glutamic acid moieties. It analyzes for carbon, hydrogen and nitrogen in agreement with its theoretical values: (percent carbon, theory: 45.45, found: 45.66; percent hydrogen, theory: 7.63, found: 7.79; percent nitrogen, theory: 10.60, found: 10.48). The yield of the product is better than 95 percent.

*Example 2*

In place of the methanol used in Example 1, may be substituted any other liquid alcohol of the class ROH, wherein R consists of a straight or branched chain alkyl group, containing from one to six carbon atoms. The remainder of the reaction is the same as described above except the reaction time must be increased with the lengthening chain of the solvent alcohol.

*Example 3*

In place of the alcohols described in Examples 1 and 2, there may be substituted an inert organic solvent such as acetone, benzene or ether in equivalent amounts. The remainder of the process is the same as previously described.

*Example 4*

To increase the blood level of the glutamate and betaine ions in order to produce optimal metabolic effects, betaine glutamate should be administered in daily dosage levels from 2 to 20 grams, preferably in three or four divided doses. Because of this dosage level, it is preferable to administer this compound in solid form; as a powder or granule, or in the form of tablets or capsules. The stability of this compound permits manufacturing of tablets or capsules by conventional methods without the use of special techniques.

Liquid preparations such as aqueous suspensions or hydroalcoholic solutions may be utilized for the administration of betaine glutamate to those patients who do not prefer tablets or capsules. For the preparation of an aqueous suspension, a suspending agent such as gum arabic or gum tragacanth may be used in concentration of from one-tenth to five-tenths percent and the vehicle may be either water or syrup. The concentration should be adjusted so that five grams of betaine glutamate are available in each tablespoon dose.

For the preparation of a hydroalcoholic solution, the betaine glutamate is dissolved in sufficient 95 percent aqueous alcohol to cause solution and diluted with simple syrup to the point of clouding. A small quantity of alcohol is then added to clarify the solution, which may be flavored and colored prior to packaging and dispensing. The concentration of betaine glutamate in hydroalcoholic solutions should be adjusted, preferably, so that at least three grams of the active material are present in each teaspoonful dose.

Irrespective of the dosage form used to administer betaine glutamate by the oral route, the compound is readily absorbed from the gastrointestinal tract and an elevated blood level of betaine ions and glutamate ions is observed within 20 minutes to one-half hour after ingestion. This blood level continues to increase, reaching its peak value between one and two hours.

*Example 5*

When it is desired to prepare a solution of betaine glutamate for parenteral use, then 3.2 grams of betaine glutamate are dissolved in 100 cc. of water for injection, utilizing a strict aseptic technique. The solution is filtered through a bacteriologic filter and filled into 100 cc. glass vials, which are sterilized by autoclaving at 15 lbs. pressure for one hour. The parenteral solution is administered by the intravenous route through an in-dwelling needle over a period of from 4 to 8 hours. Should it be desired to administer the solution in smaller increments, then the solution may be subdivided in to 25 cc. ampules, administered 3 to 4 times daily, by the intravenous route. The injection should be made slowly, utilizing the well known cautions for administration of intravenous materials.

*Example 6*

When it is desired to treat the symptoms of alcoholic gastritis, betaine glutamate may be administered in the form of a powder, granule, tablet, capsule or aqueous or hydroalcoholic solution by the oral route or as a parenteral solution dissolved in water-for-injection. The daily dosage is from 2 to 20 grams per day, administered in 3 or 4 divided doses. In practice, it will be found that the preferred daily dosage will be from between 4 and 8 grams per day and the compound is administered preferably after meals. After a period of 4 weeks of therapy, a reversing of the symptoms of alcoholic gastritis will be observed and nutritional improvement as well as increased appetite will be evident.

It is not desired to be limited except as set forth in the following claims, the above description being by way of illustration of the invention.

What is claimed is:
1. Betaine glutamate.
2. The method of conducting glutamate therapy which comprises the administering to a patient an effective amount of betaine glutamate.
3. The method in accordance with claim 2, said betaine glutamate being administered in a unit dosage form consisting of a pharmaceutical carrier and from two to ten grams of betaine glutamate.
4. A pharmaceutical preparation comprising a pharmaceutical carrier and from two to twenty grams of betaine glutamate.
5. A pharmaceutical preparation in unit dosage form comprising a pharmaceutical carrier and from 2 to 10 grams of betaine glutamate.
6. The method of treating alcoholic gastritis in humans which comprises the steps of administering to said humans a pharmaceutical preparation consisting of a pharmaceutical carrier and betaine glutamate.
7. The method of treating alcoholic gastritis in humans which comprises the steps of administering to said humans a pharmaceutical preparation in unit dosage form consisting of a pharmaceutical carrier and from 2 to 10 grams of betaine glutamate.

References Cited by the Examiner

UNITED STATES PATENTS

| 2,785,180 | 3/1957 | Julsingha | 260—534 |
| 2,802,864 | 8/1957 | Vassel | 260—501 |

OTHER REFERENCES

Ackerman: Chem. Abst., vol. 15, p. 1936, 1921.
Chemisch: Chem. Abst., vol 31, p. 712(7), 1937.
Colizzi: Chem. Abst., vol. 48, p. 2250, 1954.
Goyan: Chem. Abst., vol. 35, p. 4549(9), 1941.
Merck Index, 7th ed., pp. 486–487.
Rimmerman: Chem. Abst., vol. 45, p. 8608(g), 1951.

JULIAN S. LEVITT, *Primary Examiner.*

MORRIS O. WOLK, LEWIS GOTTS, *Examiners.*